Patented Oct. 13, 1925.

1,557,234

UNITED STATES PATENT OFFICE.

HEINRICH BECHHOLD, OF FRANKFORT-ON-THE-MAIN, GERMANY.

FILTER.

No Drawing. Continuation of application Serial No. 585,087, filed August 29, 1922. This application filed September 14, 1923. Serial No. 662,755.

*To all whom it may concern:*

Be it known that I, HEINRICH BECHHOLD, a citizen of Germany, residing at Frankfort-on-the-Main, Germany, have invented certain new and useful Improvements in or Relating to Filters, of which the following is a specification.

This invention relates to filters composed of diatomaceous earth, cellulose, clay, carbon and other materials, adapted to filter water, fruit juices, serum, toxin and other liquids.

Although the filters at present in use are well adapted to retain for a certain time micro-organisms, these very soon grow through the pores of the filter with the result that in a comparatively short time the filtered liquid becomes infected.

For the purpose of destroying micro-organisms in liquids, such as water, milk, etc., it has heretofore been suggested to pass the liquid through a bed or layer of grains of sand or other suitable material which has been coated with silver or gold or copper in the form of a colloidal film. Experiments, however, have shown that filter beds treated in this way are ineffective to retard the growing through of germs except for a relatively short period of time.

Experiments by the applicant have shown that the growing of bacteria through a porous filter can be prevented if the porous filter mass is uniformly impregnated with insoluble or difficultly soluble compounds of metals having a lower solution tension than hydrogen and a higher solution tension than platinum.

The more important of this group of metals are copper, silver and mercury. However the insoluble compounds of silver and mercury are much more effective than the insoluble compounds of copper. Of comparatively less importance are bismuth, antimony and arsenic. The following compounds may be mentioned, by way of example, as effective and usable impregnating materials: copper oxide, copper ferrocyanate, copper carbonate, silver chloride, silver oxide, silver sulphocyanate, mercuric oxide and mercurous chloride. The oxides of bismuth and antimony, the sulphides of arsenic and the like can also be used, but with less effective results.

It is possible to obtain good results with a filter impregnated with a single compound of a metal having the character specified, for example silver chloride or copper oxide. A filter so impregnated will prevent the growing through of bacteria for a long time. However, better results are obtained if in addition to a principal impregnating material an activating material is used. As activating materials there can be applied insoluble or difficultly soluble compounds of metals from the group of principal impregnating materials. There can also be used for this purpose insoluble or difficultly soluble compounds which do not belong to the group of principal materials, as well as metals. In general, activators for the purpose of this invention are metal compounds or metals of lower solution tension than hydrogen, for example, gold, platinum and the like.

According to this invention, for example, the impregnating materials can be copper oxide as principal ingredient and silver chloride or silver or copper or mercurous chloride, as activator. Here all the components belong to the group of principal ingredients. In another example, silver chloride or copper oxide is the principal ingredient with an addition of gold or platinum as activator.

Generally it proved to be advantageous to use the principal ingredient in predominant quantity with a relatively small quantity of activating material. Working with two or more substances from the group of principal ingredients of which one is employed as a principal ingredient and the other as an activator, it proved advantageous to use the substance having the higher solution tension as activator. Excellent results were obtained with filters which had been impregnated with silver chloride as principal ingredient and with platinum as an activator, the silver chloride forming 2% of the weight of the filter and the platinum only a small fraction of the silver chloride.

It is within the scope of the invention to use two or more activating ingredients instead of one. For example copper oxide could be used as the principal ingredient and relatively small quantities of silver and gold as activator. Instead of one principal ingredient for impregnation of the filter two or more could be used. For example, equal parts of copper oxide and silver chloride could be used as a principal ingredient and, as an activator, a small quantity of gold or platinum.

Experiments have shown, however, that the combination of a single principal ingredient, for example, copper oxide or silver chloride, with a small quantity of a single activating substance, such as gold or platinum, gives very satisfactory results.

The following experiment will serve by way of example to illustrate the superiority of a filter treated according to the present invention over a filter which has been impregnated with a single metal, for example, silver:—

Water infected with bacterium coli was passed through three equal kieselguhr filters. The first filter was not impregnated at all. The second filter was impregnated with silver, the quantity of silver incorporated therein amounting approximately to 2% of the weight of the filtering mass. The third filter was impregnated with 2% of silver chloride and with a relatively small quantity of gold sulphide. Initially all three filters gave a filtrate free of bacteria. After two days the unimpregnated filter yielded a filtrate infected by bacterium coli. After six days the filter impregnated with silver gave a filtrate infected with bacterium coli, while the filter impregnated with silver chloride and gold sulphide gave a filtrate free of bacteria even after several months. Other bacteria, such as B. typhosus, B. paratyphosus, etc., were prevented from passing or growing through the filter. Even sprophyte water bacteria which as is well-known grow particularly quickly through filters were prevented for months from growing through filters impregnated in accordance with the present invention.

The present application is a continuation of my application, Serial Number 585,087, filed Aug. 29, 1922, Patent Number 1,473,331.

I claim:

1. A filter impregnated with an insoluble or difficultly soluble compound of a metal of lower solution tension than hydrogen and of a higher solution tension than copper.

2. A filter impregnated with an insoluble or difficultly soluble compound of silver.

3. A filter impregnated with chloride of silver.

In testimony whereof I affix my signature.

HEINRICH BECHHOLD. [L. S.]